(12) United States Patent
Himeno

(10) Patent No.: US 6,324,114 B1
(45) Date of Patent: *Nov. 27, 2001

(54) SEMICONDUCTOR MEMORY DEVICE USING A PLURALITY OF SEMICONDUCTOR MEMORY CHIPS MOUNTED IN ONE SYSTEM AND A SEMICONDUCTOR MEMORY SYSTEM USING A PLURALITY OF SEMICONDUCTOR MEMORY DEVICES

(75) Inventor: Toshihiko Himeno, Yokohama (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/175,446

(22) Filed: Oct. 20, 1998

(30) Foreign Application Priority Data

Oct. 20, 1997 (JP) .................................................. 9-286926

(51) Int. Cl.[7] ..................................................... G11C 8/00
(52) U.S. Cl. .................................. 365/230.03; 365/230.06
(58) Field of Search ............................ 365/230.03, 230.06, 365/230.08, 236, 225.7, 49

(56) References Cited

U.S. PATENT DOCUMENTS

| | | | | |
|---|---|---|---|---|
| 5,299,147 | * | 3/1994 | Holst ....................................... | 365/49 |
| 5,463,751 | * | 10/1995 | Yonezawa et al. ..................... | 365/49 |
| 5,530,824 | * | 6/1996 | Peng et al. .............................. | 365/49 |
| 5,535,351 | * | 7/1996 | Peng ....................................... | 365/49 |
| 5,646,878 | * | 7/1997 | Samra .................................... | 365/49 |

FOREIGN PATENT DOCUMENTS

| | | |
|---|---|---|
| 64-39688 | 2/1989 | (JP) . |
| 7-319765 | 12/1995 | (JP) . |
| 2-83895 | 9/1998 | (JP) . |

* cited by examiner

*Primary Examiner*—Trong Phan
(74) *Attorney, Agent, or Firm*—Banner & Witcoff, Ltd.

(57) ABSTRACT

A semiconductor memory device has an address input circuit system capable of specifying a virtual memory space having a capacity larger than the actual storage capacity and a decoder system and sets the output terminal of a data output circuit system into a high impedance state when an address other than the previously specified addresses for the real memory space is specified. A plurality of semiconductor memory devices described above are used to construct a semiconductor memory system by commonly connecting corresponding ones of all of the input/output signal pins in parallel.

72 Claims, 7 Drawing Sheets

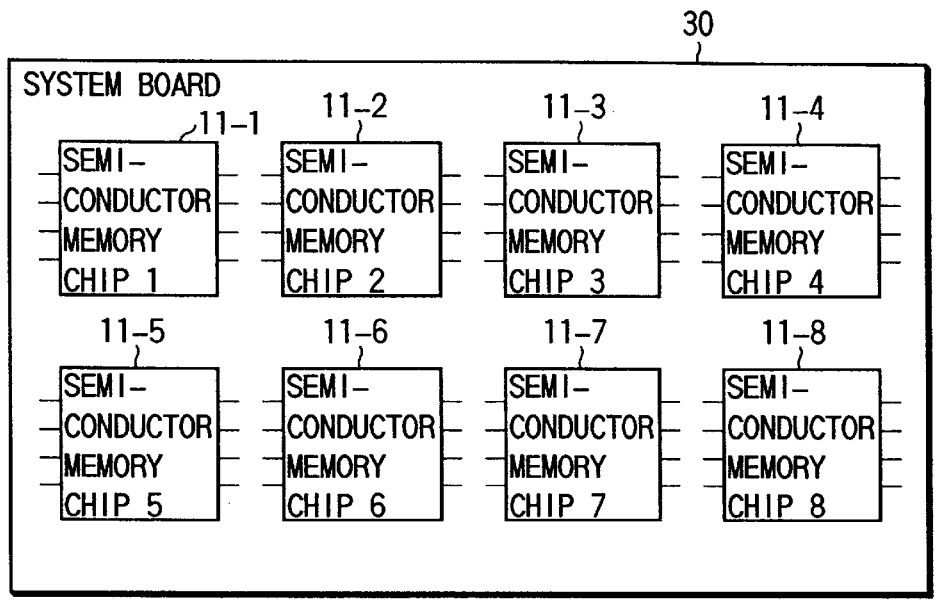
FIG. 8
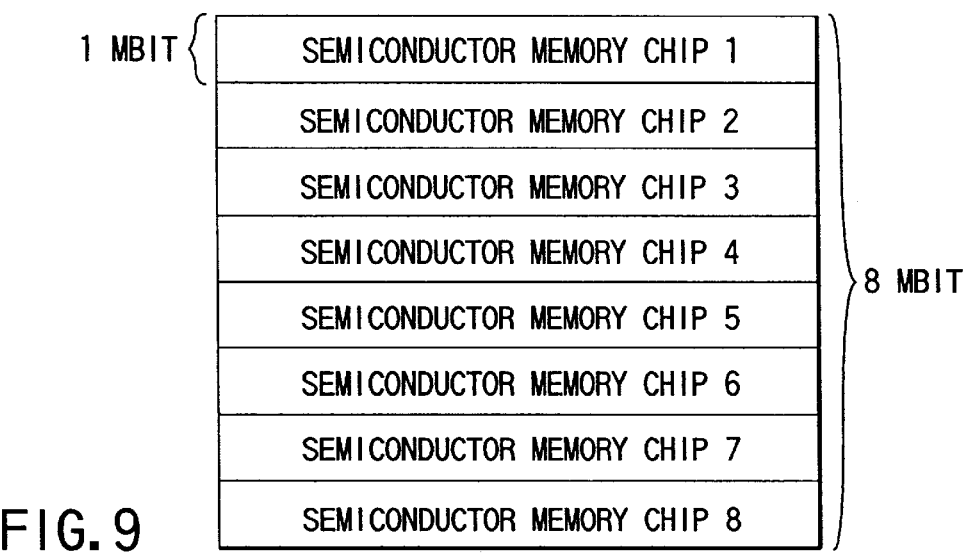
FIG. 9
| NAME OF INPUT PIN | Pin0 | Pin1 | Pin2 | Pin3 | Pin4 | Pin5 | Pin6 | Pin7 |
|---|---|---|---|---|---|---|---|---|
| FIRST TIME | A0 | A1 | A2 | A3 | A4 | A5 | A6 | A7 |
| SECOND TIME | A8 | A9 | A10 | A11 | A12 | A13 | A14 | A15 |
| THIRD TIME | A16 | A17 | A18 | A19 | A20 | | | |
FIG. 10

SEMICONDUCTOR MEMORY DEVICE USING A PLURALITY OF SEMICONDUCTOR MEMORY CHIPS MOUNTED IN ONE SYSTEM AND A SEMICONDUCTOR MEMORY SYSTEM USING A PLURALITY OF SEMICONDUCTOR MEMORY DEVICES

BACKGROUND OF THE INVENTION

This invention relates to a semiconductor memory device using a plurality of semiconductor memory chips mounted in one system and a semiconductor memory system using a plurality of semiconductor memory devices having the same construction as described above, and more particularly to a semiconductor memory device which is desired to be operated in apparently the same manner as a one-chip semiconductor memory device by combining and mounting semiconductor memory chips and a semiconductor memory system which is formed of a plurality of semiconductor memory chips of the preceding generation and designed according to an interface exactly the same as an interface used for one chip system of the next generation so as to design a system of the next generation in advance.

In the case where a plurality of semiconductor memory chips are mounted into a single system, it is not possible that all of the input signal lines, output signal lines and input/output signal lines, for example, in the respective chips are commonly connected simply to the corresponding signal lines. This is because, if a plurality of chips are simultaneously operated, data cannot be properly read out due to a collision among their output signals. Therefore, conventionally, the semiconductor memory system having a plurality of semiconductor memory chips mounted thereon is constructed as shown in FIG. 1, for example. An input lines 12, output lines 13 and control lines 14 are commonly connected to corresponding signal pins of semiconductor memory chips 11-1, 11-2, ..., 11-n. A chip selection controller 15 is supplied with a chip selection signal for selecting the semiconductor memory chip 11-1, 11-2, ..., 11-n and chip selection signals (chip enable signals) $\overline{CE1}$, $\overline{CE2}$, ..., $\overline{CEn}$ output from the chip selection controller 15 are respectively supplied to chip enable pins of the semiconductor memory chips 11-1, 11-2, ..., 11-n via chip selection signal lines 16-1, 16-2, ..., 16-n.

With the above construction, at the time of access to the chip 11-1, 11-2, ..., 11-n, a desired chip 11-m (m=1, 2, ..., n) is selected and set into the enable state by outputting the chip selection signal $\overline{CE1}$, $\overline{CE2}$, ..., $\overline{CEn}$ from the chip selection controller 15 and non-selected chips are set into the disable state and the output terminals of the non-selected chips are set into the high impedance state. Then, the readout, programming or erasing process is effected for the selected chip 11-m and the same process is effected for another chip by selectively changing the selected chip. In this case, it is necessary for the system to recognize that a plurality of semiconductor memory chips are mounted and each of the chips is operated as an independent chip.

With this construction, since the output terminals of the non-selected chips are set in the high impedance state, common signal lines (for example, input lines 12, output lines 13, control lines 14 or the like) can be used for signals other than the chip selection signals $\overline{CE1}$, $\overline{CE2}$, ..., $\overline{CEn}$ and since each chip is independently operated, the power consumption of the system can be saved.

However, with the above construction, since the chip selection controller 15 becomes necessary and the chip selection signal lines 16-1, 16-2, ..., 16-n are required to be arranged exclusively for the chips 11-1, 11-2, ..., 11-n, it is necessary to arrange chip selection signal lines of a number equal to the number of chips. Further, since the chips 11-1, 11-2, ..., 11-n are independently operated, the operation for continuously reading out data from different chips cannot be basically effected. If the address input lines and data output lines are separately arranged for the respective chips, output signals can be separately derived from the respective chips by inputting common signals as the input signal in parallel, but this cannot be applied when I/O sections are multiplexed and used as bi-directional terminals. Further, continuous access to different chips can be made by using the chip selection signals $\overline{CE1}$, $\overline{CE2}$, ..., $\overline{CEn}$ as highest address signals if the address input pins of the chips 11-1, 11-2, ..., 11-n are made completely independent from one another and the I/O sections are not multiplexed, but they cannot be used in exactly the same manner if the address inputs are multiplexed.

In a semiconductor memory system used in various types of portable electronic devices, for example, in a small-sized memory card, a semiconductor memory chip 11 is connected to card terminals 21, 22, 23, 24 via input signal lines 17, output signal lines 18, control signal lines 19 and chip selection signal line 20 as shown in FIG. 2A. On the small-sized memory card, generally, a nonvolatile semiconductor memory device is mounted and an attached circuit such as a controller is not at all provided.

In order to mount a plurality of semiconductor memory chips 11-1, 11-2, ..., 11-n on the small-sized memory card, it is necessary to connect a plurality of chip selection signal lines 20-1, 20-2, ..., 20-n to card terminals 24-1, 24-2, ..., 24-n as shown in FIG. 2B, and therefore, it is impossible to set the same specification (the number of card terminals, the pitch between the terminals, the arrangement thereof and the like) as a memory card having one chip contained therein. For this reason, the same memory card driver as that used for the memory card containing one chip cannot be used and the design of the potable electronic device itself must be changed.

For example, Jpn. Pat. Appln. KOKOKU Publication No. 2-760811 and Jpn. Pat. Appln. KOKAI Publication No. 7-319765 disclose a "semiconductor integrated circuit" of such a structure as to have, instead of the above-mentioned chip selection controller 15, a memory circuit for storing chip address data in a corresponding one of respective semiconductor chips 11-1, 11-2, ..., 11-n. In the semiconductor integrated circuit disclosed in these publications', a comparison is made between an input chip address and a stored chip address data. If there is a coincidence between them, a corresponding chip is selected, but, if there occurs a non-coincidence, a chip selection is not done. By doing so, the above-mentioned chip selection controller 15 is not necessary.

If however, many more chips are mounted on a small-sized memory card, then a comparison circuit for comparing an input chip address and a stored chip address data becomes complicated, so that there occurs a greater delay time in a chip address inputting path. This causes a greater speed difference between a normal address inputting path and the chip address inputting path and, hence, a circuit design becomes difficult.

Thus, in the conventional semiconductor memory system, the design of the system including the peripheral circuit thereof and the application method must be changed in a case wherein only one semiconductor memory chip is used and a case wherein a plurality of semiconductor memory chips are mounted.

Further, in the conventional semiconductor memory device, when a plurality of semiconductor memory chips are mounted on a single system to form a semiconductor memory system having a large memory capacity, the circuit design and application method must be changed from those used in a case wherein a single semiconductor memory chip is independently used, and it becomes necessary to recognize the presence of a plurality of semiconductor memory chips and re-construct a system. Further, in order to attain exactly the same input/output relation of the system in a case wherein a single semiconductor memory chip is used and in a case wherein a plurality of semiconductor memory chips are used, it is necessary to add various signal lines and control circuits and the cost will rise.

BRIEF SUMMARY OF THE INVENTION

Accordingly, a first object of this invention is to provide a semiconductor memory device which can be used in exactly the same manner in a case wherein a plurality of semiconductor memory chips are mounted on a single system and in a case wherein a semiconductor memory chip is mounted in a singular form, and a semiconductor memory system constructed by use of a plurality of semiconductor memory devices which are the same as the above semiconductor memory device.

Further, a second object of this invention is to provide a semiconductor memory device which can be apparently observed the same when a semiconductor memory chip is mounted in a singular form and when a plurality of semiconductor memory chips are mounted and can be designed according to the same interface as that for a system of the next generation having one chip by using a plurality of semiconductor memory chips of the preceding generation in order to design the system of the next generation in advance, and a semiconductor memory system constructed by use of a plurality of semiconductor memory devices which are the same as the above semiconductor memory device.

The first object can be attained by a semiconductor memory device comprising first input means supplied with a first address signal for specifying a real memory space of a memory cell array; second input means supplied with a second address signal for specifying a virtual memory space larger than a storage capacity of the memory cell array; real memory position setting means for setting a position of the real memory space in the virtual memory space from the exterior; determination means for determining whether or not an address designated by the second address signal coincides with the position of the real memory space in the virtual memory space set by the real memory position setting means; address decoder means for decoding an output signal of the first input means and accessing the memory cell array when the determination means determines that the real memory space is accessed; and output means for outputting data read out from the memory cell array.

Further, the first object can be attained by a semiconductor memory device comprising first input means supplied with a first address signal for specifying a real memory space of a memory cell array; second input means supplied with a second address signal for specifying a virtual memory space having a capacity larger than a storage capacity of the memory cell array; counting means for latching the first and second address signals input to the first and second input means and sequentially counting up the address signals; real memory position setting means for setting a position of the real memory space in the virtual memory space from the exterior; determination means for determining whether or not an address designated by the second address signal coincides with the position of the real memory space in the virtual memory space set by the real memory position setting means; address decoder means for decoding an output signal of the first input means and accessing the memory cell array when the determination means determines that the real memory space is accessed; and output means for outputting data read out from the memory cell array; wherein the second address signal is counted up by the counting means irrespective of the setting contents of the real memory position setting means and an output signal corresponding to the second address signal is controlled to be inverted or not according to the setting contents of the real memory position setting means before a count output of the counting means is input to the address decoder means.

The first object can be also attained by a semiconductor memory device comprising an input buffer supplied with a first address signal for specifying a real memory space of a memory cell array; real memory position setting means for setting a position of the real memory space in a virtual memory space having a capacity larger than a storage capacity of the memory cell array from the exterior; an input switching circuit supplied with a second address signal for specifying the virtual memory space, for inverting the second address signal or keeping the second address signal non-inverted to form an internal address signal according to the position of the real memory space in the virtual memory space set by the real memory position setting means; an address decoder for decoding an output signal from the input buffer and the internal address signal output from the input switching circuit to access the memory cell array; an output buffer for outputting data read out from the memory cell array; and a chip address decoder circuit for decoding the internal address signal output from the input switching circuit and setting an output terminal of the output buffer into a high impedance state when the real memory space is not accessed.

The first object can be attained by a semiconductor memory device comprising an input buffer supplied with a first address signal for specifying a real memory space of a memory cell array; a real memory position setting circuit for setting a position of the real memory space in a virtual memory space having a capacity larger than a storage capacity of the memory cell array from the exterior; an input switching circuit supplied with a second address signal for specifying the virtual memory space, for inverting the second address signal or keeping the second address signal non-inverted to form an internal address signal according to the position of the real memory space in the virtual memory space set by the real memory position setting circuit; an address decoder for decoding an output signal from the input buffer and the internal address signal output from the input switching circuit to access the memory cell array; an output buffer for outputting data read out from the memory cell array; and a chip address decoder circuit for decoding the internal address signal output from the input switching circuit and setting a chip into a stand-by state when the real memory space is not accessed.

Further, the first object can be attained by a semiconductor memory device comprising an input buffer supplied with a first address signal for specifying a real memory space of a memory cell array; a real memory position setting circuit for setting a position of the real memory space in a virtual memory space having a capacity larger than a storage capacity of the memory cell array from the exterior; an input switching circuit supplied with a second address signal for specifying the virtual memory space, for inverting the second address signal or keeping the second address signal non-inverted to form an internal address signal according to the position of the real memory space in the virtual memory space set by the real memory position setting circuit; an address decoder for decoding an output signal from the input buffer and the internal address signal output from the input switching circuit to access the memory cell array; an output buffer for outputting data read out from the memory cell array; and a chip address decoder circuit for decoding the internal address signal output from the input switching circuit and setting a chip into a stand-by state and setting an output terminal of the output buffer into a high impedance state when the real memory space is not accessed.

With the above construction, when a plurality of semiconductor memory chips are mounted on a single system to construct a semiconductor memory system having a large memory capacity, the system can be used in exactly the same manner as in a case wherein each of the chips is independently used by commonly connecting corresponding ones of all of the input signal lines, output signal lines and input/output signal lines of the chips, and it is not necessary to recognize the presence of a plurality of chips and re-construct a system. Further, exactly the same input/output relation of the system can be attained in a case wherein the chip is used in a singular form and in a case wherein a plurality of chips are used. Further, when a system construction of the next generation is studied, the system development can be made completely independent from the development schedule of the semiconductor memory device since the system can be designed by using the semiconductor memory chip of the preceding generation in a completely compatible manner with the semiconductor memory chip of the next generation.

The second object of this invention can be attained by a semiconductor memory system comprising a plurality of semiconductor memory devices mounted with corresponding ones of all of input/output signal pins commonly connected in parallel; each of the plurality of semiconductor memory devices including: first input means supplied with a first address signal for specifying a real memory space of a memory cell array; second input means supplied with a second address signal for specifying a virtual memory space having a capacity larger than a storage capacity of the memory cell array; real memory position setting means for setting a position of the real memory space in the virtual memory space from the exterior; determination means for determining whether or not an address designated by the second address signal coincides with the position of the real memory space in the virtual memory space set by the real memory position setting means; address decoder means for decoding an output signal of the first input means and accessing the memory cell array when the determination means determines that the real memory space is accessed; and output means for outputting data read out from the memory cell array; wherein the output means is set into a high impedance state when the determination means determines that the real memory space is not accessed.

Further, the second object can be attained by a semiconductor memory system comprising a plurality of semiconductor memory devices mounted with corresponding ones of all of input/output signal pins commonly connected in parallel; each of the plurality of semiconductor memory devices including: first input means supplied with a first address signal for specifying a real memory space of a memory cell array; second input means supplied with a second address signal for specifying a virtual memory space having a capacity larger than a storage capacity of the memory cell array; real memory position setting means for setting a position of the real memory space in the virtual memory space from the exterior; determination means for determining whether or not an address designated by the second address signal coincides with the position of the real memory space in the virtual memory space set by the real memory position setting means; address decoder means for decoding an output signal of the first input means and accessing the memory cell array when the determination means determines that the real memory space is accessed; and output means for outputting data read out from the memory cell array; wherein the chip is set into a stand-by state when the determination means determines that the real memory space is not accessed.

The second object can be also attained by a semiconductor memory system comprising: a plurality of semiconductor memory devices mounted with corresponding ones of all of input/output signal pins commonly connected in parallel; each of the plurality of semiconductor memory devices including: first input means supplied with a first address signal for specifying a real memory space of a memory cell array; second input means supplied with a second address signal for specifying a virtual memory space having a capacity larger than a storage capacity of the memory cell array; real memory position setting means for setting a position of the real memory space in the virtual memory space from the exterior; determination means for determining whether or not an address designated by the second address signal coincides with the position of the real memory space in the virtual memory space set by the real memory position setting means; address decoder means for decoding an output signal of the first input means and accessing the memory cell array when the determination means determines that the real memory space is accessed; and output means for outputting data read out from the memory cell array; wherein the chip is set into a stand-by state and the output means is set into a high impedance state when the determination means determines that the real memory space is not accessed.

The second object can be attained by a semiconductor memory system comprising: a plurality of semiconductor memory devices mounted with corresponding ones of all of input/output signal pins commonly connected in parallel; each of the plurality of semiconductor memory devices including: an input buffer supplied with a first address signal for specifying a real memory space of a memory cell array; real memory position setting means for setting a position of the real memory space in the virtual memory space having a capacity larger than a storage capacity of the memory cell array from the exterior; an input switching circuit supplied with a second address signal for specifying the virtual memory space, for inverting the second address signal or keeping the second address signal non-inverted to form an internal address signal according to the position of the real memory space in the virtual memory space set by the real memory position setting means; an address decoder for decoding an output signal from the input buffer and the internal address signal output from the input switching circuit to access the memory cell array; an output buffer for outputting data read out from the memory cell array; and a chip address decoder circuit for decoding the internal address signal output from the input switching circuit and setting an output terminal of the output buffer into a high impedance state when the real memory space is not accessed.

Further, the second object can be attained by a semiconductor memory system comprising: a plurality of semiconductor memory devices mounted with corresponding ones of all of input/output signal pins commonly connected in parallel; each of the plurality of semiconductor memory devices including: an input buffer supplied with a first address signal for specifying a real memory space of a memory cell array; real memory position setting means for setting a position of the real memory space in the virtual memory space having a capacity larger than a storage capacity of the memory cell array from the exterior; an input switching circuit supplied with a second address signal for specifying the virtual memory space, for inverting the second address signal or keeping the second address signal non-inverted to form an internal address signal according to the position of the real memory space in the virtual memory space set by the real memory position setting means; an address decoder for decoding an output signal from the input buffer and the internal address signal output from the input switching circuit to access the memory cell array; an output buffer for outputting data read out from the memory cell array; and a chip address decoder circuit for decoding the internal address signal output from the input switching circuit and setting a chip into a stand-by state when the real memory space is not accessed.

The second object can be attained by a semiconductor memory system comprising: a plurality of semiconductor memory devices mounted with corresponding ones of all of input/output signal pins commonly connected in parallel; each of the plurality of semiconductor memory devices including: an input buffer supplied with a first address signal for specifying a real memory space of a memory cell array; real memory position setting means for setting a position of the real memory space in the virtual memory space having a capacity larger than a storage capacity of the memory cell array from the exterior; an input switching circuit supplied with a second address signal for specifying the virtual memory space, for inverting the second address signal or keeping the second address signal non-inverted to form an internal address signal according to the position of the real memory space in the virtual memory space set by the real memory position setting means; an address decoder for decoding an output signal from the input buffer and the internal address signal output from the input switching circuit to access the memory cell array; an output buffer for outputting data read out from the memory cell array; and a chip address decoder circuit for decoding the internal address signal output from the input switching circuit and setting a chip into a stand-by state and setting an output terminal of the output buffer into a high impedance state when the real memory space is not accessed.

With the above construction, since the system can be used in exactly the same input/output relation as in a case wherein the chip is used in a singular form even when a plurality of semiconductor memory devices are mounted, the system can be apparently treated as a single chip. Therefore, it is not necessary to recognize whether a single chip is used or a plurality of chips are used, exactly the same input/output relation of the system can be attained when the single chip is used and when a plurality of chips are used, and the system is not required to be re-constructed. Further, access to different chips such as continuous readout for a plurality of semiconductor memory devices can be effected without feeling the interval between the chips.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 8 is a top plan view showing an example of the system construction having eight NAND type flash memory chips mounted on a single system board, for illustrating a semiconductor memory device and a semiconductor memory system according to a second embodiment of this invention;

FIG. 9 is a schematic diagram showing the relation between a virtual memory space and a real memory space in the system shown in FIG. 8;

FIG. 10 is a diagram for illustrating an address input method in the semiconductor memory system shown in FIGS. 8 and 9.

DETAILED DESCRIPTION OF THE INVENTION

Figure 1:
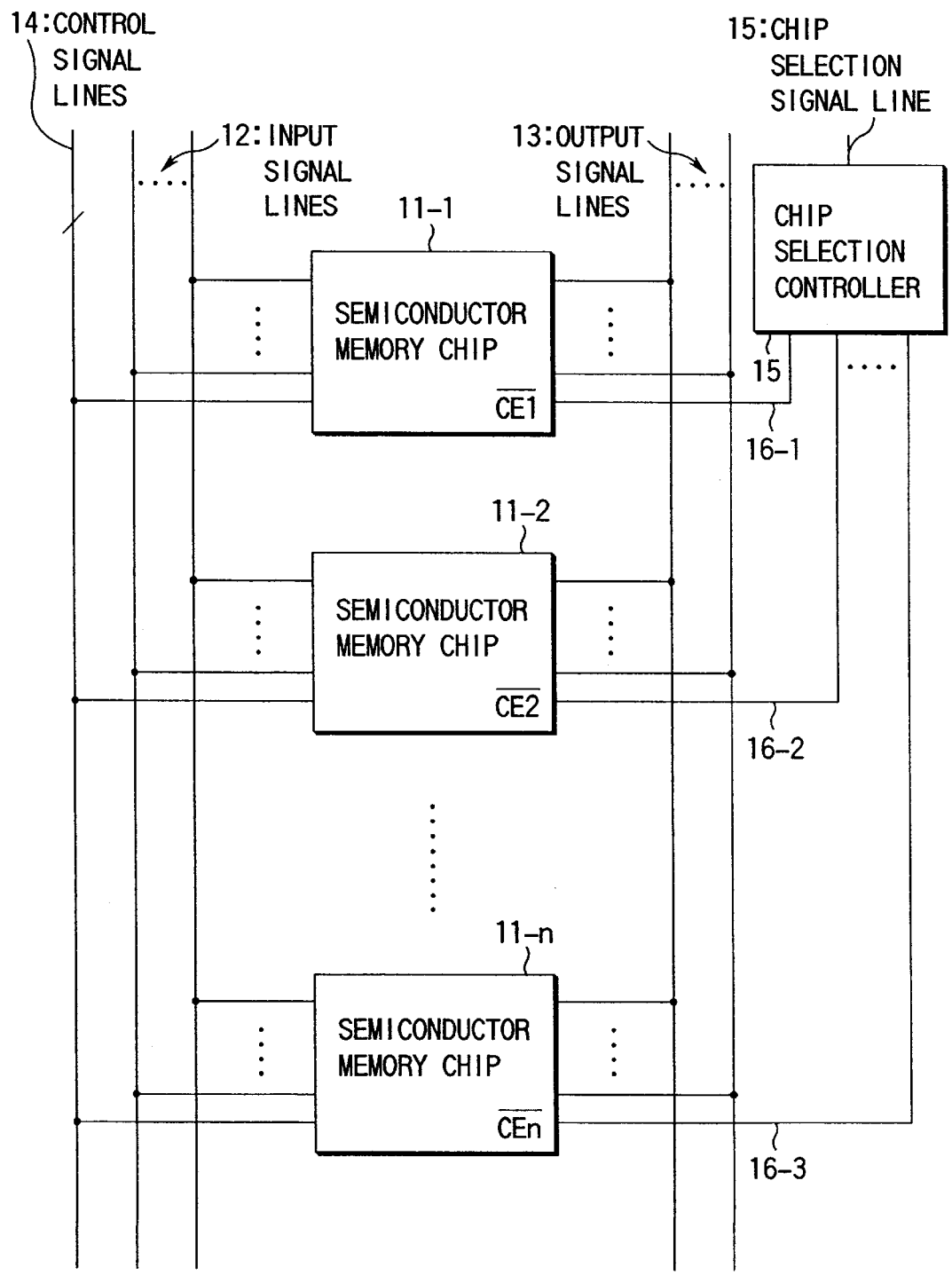
FIG. 1 is a block diagram showing a conventional semiconductor memory system having a plurality of semiconductor memory chips mounted thereon.
Figure 2A:
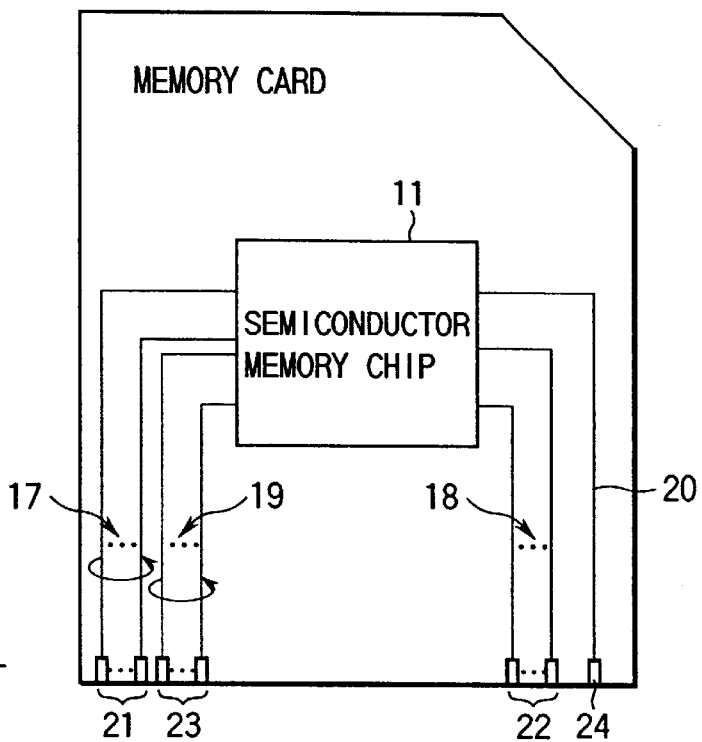
FIG. 2A is a top plan view showing a conventional small-sized memory card which is used in various types of portable electronic devices and on which a single semiconductor memory chip is mounted.
Figure 2B:
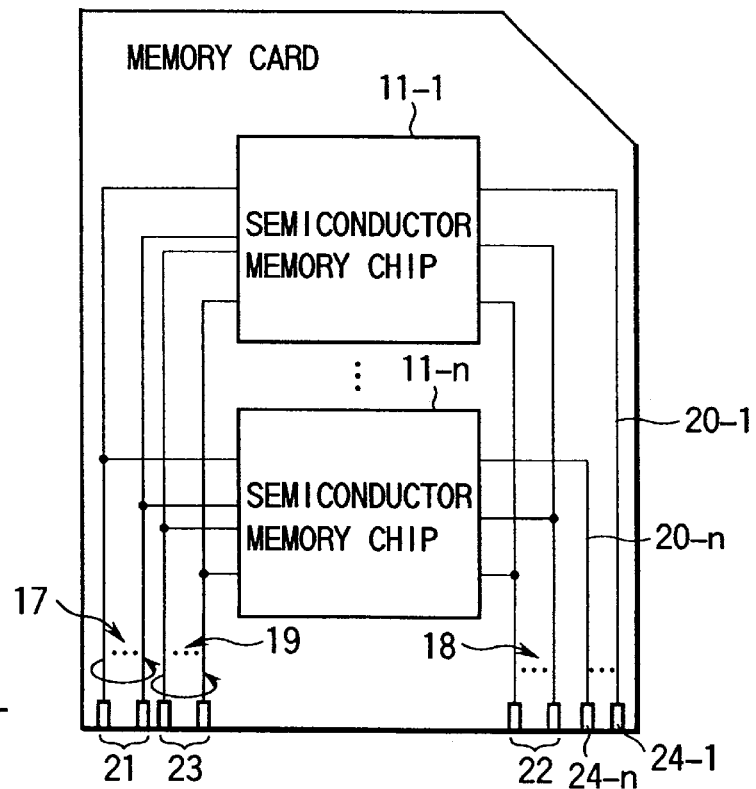
FIG. 2B is a top plan view showing a conventional small-sized memory card which is used in various types of portable electronic devices and on which a plurality of semiconductor memory chips are mounted.
Figure 3:
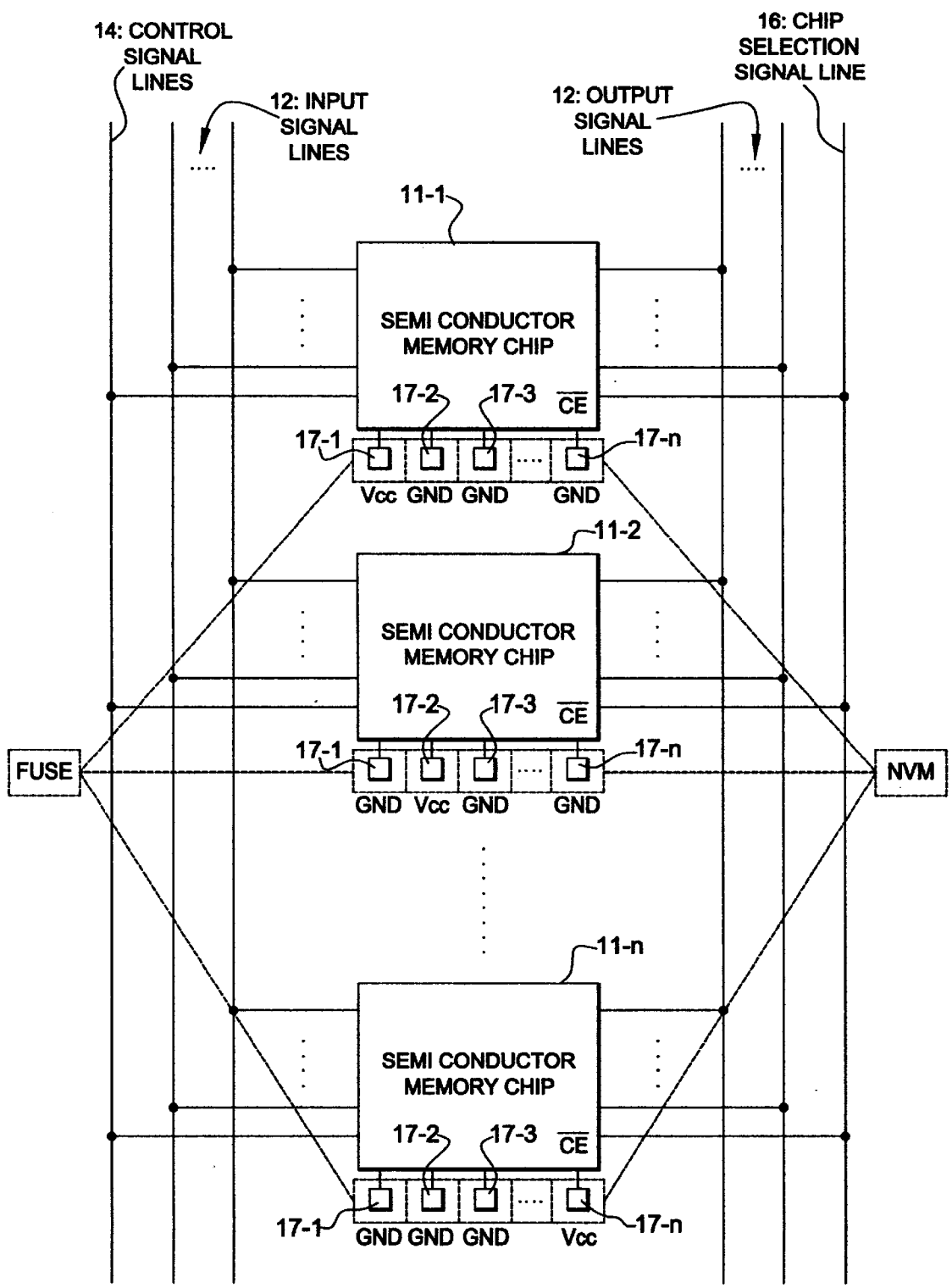
FIG. 3 is a block diagram showing an example of the schematic construction of a semiconductor memory system, for illustrating a semiconductor memory device and a semiconductor memory system according to a first embodiment of this invention.

FIG. 3 is a block diagram showing an example of the construction of a semiconductor memory system according to a first embodiment of this invention. Input lines 12, output lines 13, control lines 14 and chip selection signal line 16 are commonly connected in parallel to corresponding semiconductor memory chips 11-1, 11-2, . . . , 11-n. Each of the semiconductor memory chips 11-1, 11-2, . . . , 11-n has an address decoder system and an address input circuit system capable of specifying a virtual memory space which is at least n times larger than the real memory space thereof and option pins 17-1, 17-2, . . . , 17-n for indicating a position in the virtual memory space which corresponds to the real memory space of the chip is provided as real memory position setting means. The option pins 17-1, 17-2, . . . , 17-n are selectively applied with a power supply potential Vcc and ground potential Vss, and in this example, the position of the real memory space in the virtual memory space is specified according to the position of the option pin applied with the power supply potential Vcc.

The real memory space is intended to mean a memory space designated by an address corresponding to a respective memory cell in a semiconductor memory chip. The virtual memory space is intended to mean a memory space designated by an address of a respective memory cell not possessed by the semiconductor memory chip, that is, designated by an address corresponding to a respective memory cell in another semiconductor memory chip.

Figure 4:
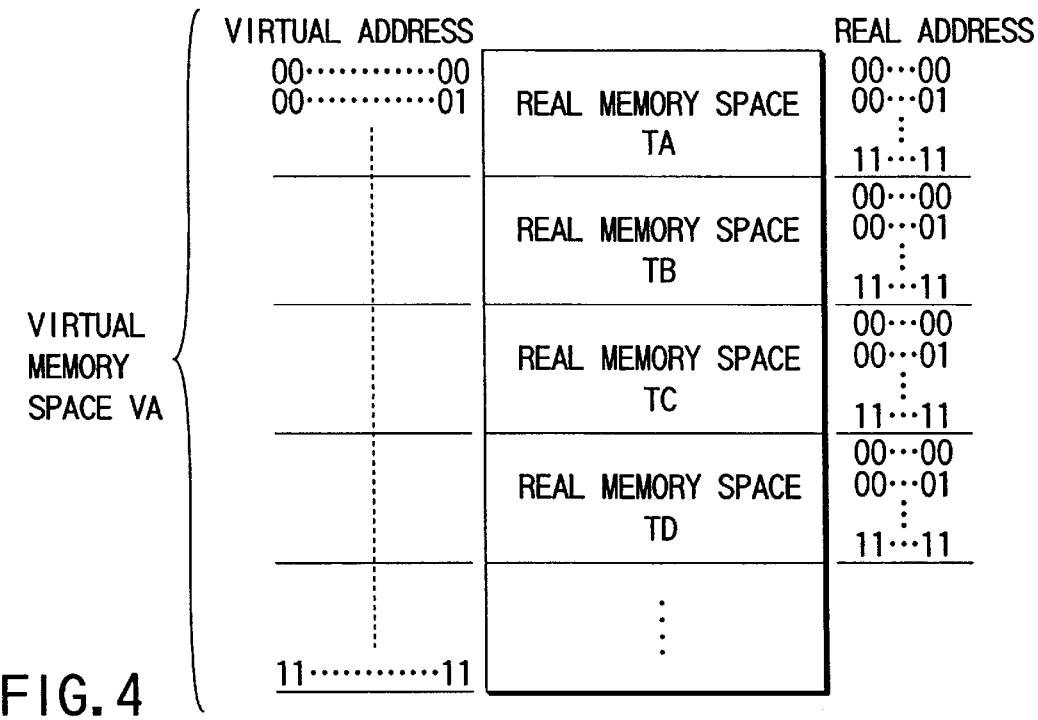
FIG. 4 is a schematic diagram showing the relation between a virtual memory space and a real memory space in each of semiconductor memory chip shown in FIG. 3.

Generally, a circuit of the address decoder system of the semiconductor memory device can specify only the real memory space corresponding to the storage capacity of the memory cell array, but each of the semiconductor memory chips 11-1, 11-2, . . . , 11-n in the system shown in FIG. 3 has an address input circuit system and address decoder system constructed such that a virtual memory space VA including real memory spaces TA, TB, TC, TD, . . . which each chip has as shown in FIG. 4 and having a capacity equal to or larger than n times the real memory space can be specified for the real memory spaces TA, TB, TC, TD, . . . .

Figure 5:
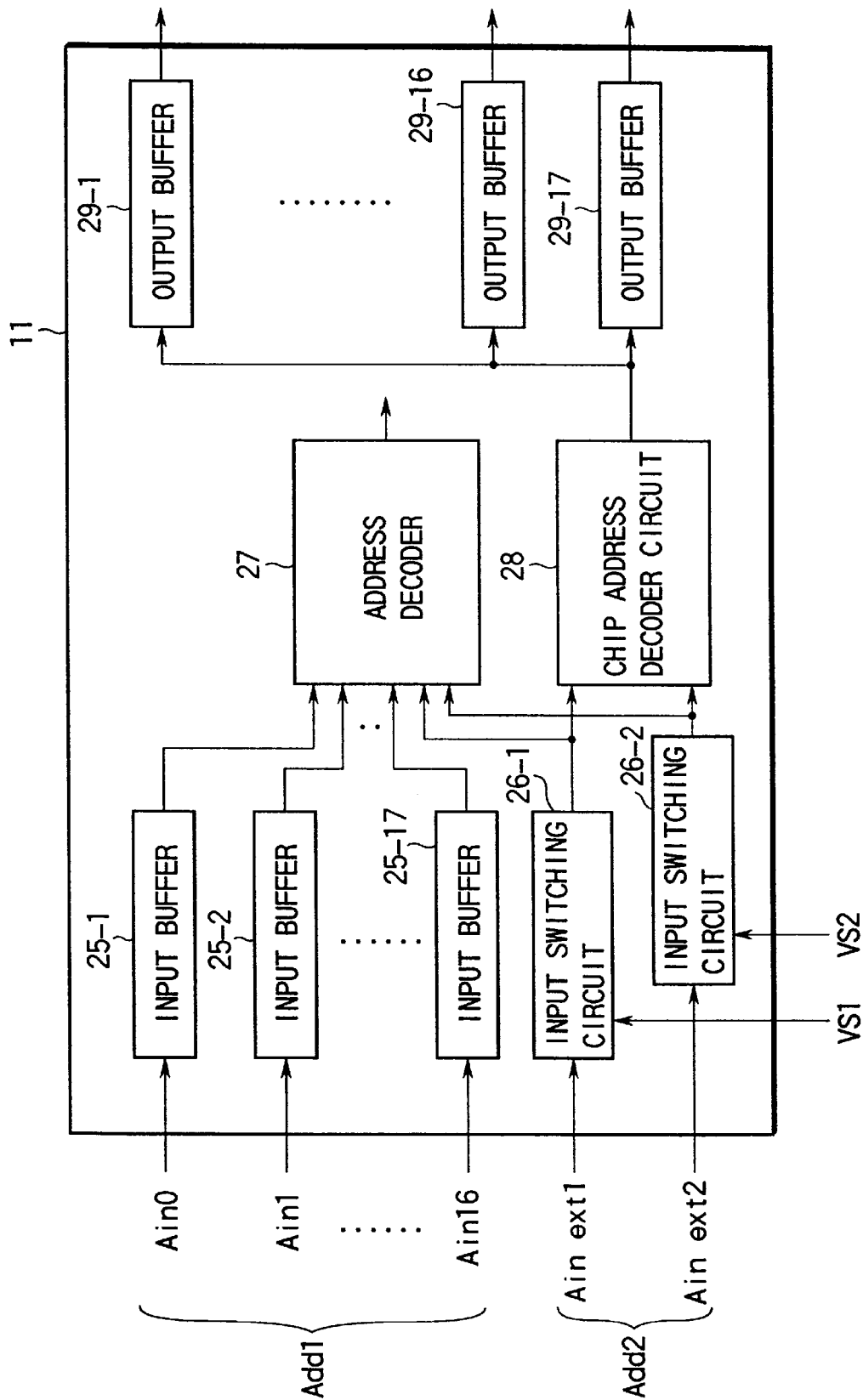
FIG. 5 is a block diagram showing the schematic construction of the main portions of an address input circuit system, address decoder system and data output circuit system extracted for illustrating an example of the concrete construction of the semiconductor memory device.

FIG. 5 shows the schematic construction of the main portions extracted from an address input circuit system, address decoder system and data output circuit system, for illustrating an example of the concrete construction of each semiconductor memory device of the semiconductor memory system shown in FIGS. 3 and 4. In this FIG. 5, an example of the construction of the semiconductor memory device when constructing a 4-Mbit semiconductor memory system by mounting four 1-Mbit semiconductor memory chips is shown. If each chip has a one byte by 8 bits configuration, a 1-Mbit memory space can be specified by use of 17 address signal lines.

To the semiconductor memory system, a 2-bit address signal Add2 for permitting the virtual memory space VA which is four times the real memory space to be specified is input in addition to a first address signal Add1 of 17 bits necessary for specifying the 1-Mbit real memory space TA, TB, TC, TD corresponding to each chip. That is, input buffers (first input means) 25-1 to 25-17 are supplied with address signals Ain0 to Ain16 for specifying the real memory space and input switching circuits 26-1, 26-2 are supplied with address signals Ainext1, Ainext2 for specifying the virtual memory space, respectively. The switching circuits (second input means) 26-1, 26-2 are applied with first, second potentials VS1, VS2 (Vcc or Vss) for specifying the position of the real memory space TA, TB, TC or TD of the chip in the virtual memory space VA from the option pins 17-1, 17-2, 17-3, . . . , 17-n. The input switching circuits 26-1, 26-2 effect the switching operation to supply the address signals Ainext1, Ainext2 as they are (non-inverted) as internal address signals to an address decoder (address decoding means) 27 or supply them after inverting according to the first, second potentials VS1, VS2 indicating the position of the real memory space in the virtual memory space VA. Output signals of the input buffers 25-1 to 25-17 and internal address signals output from the input switching circuits 26-2, 26-2 are supplied to the address decoder circuit 27 and decoded therein.

Further, the internal address signals output from the input switching circuits 26-2, 26-2 are supplied to a chip address decoder circuit (determining means) 28 for determining whether the corresponding chip is selected or not and it is determined whether or not the chip address specified by the address signals Ainext1, Ainext2 coincides with the position of the real memory space in the virtual memory space previously specified. The operation or non-operation of respective output buffers (output means) 29-1 to 29-17 is controlled by an output of the chip address decoder circuit 28. When there occurs a coincidence between a chip address designated by a address signals Ainext1 and Ainext2 and an address designated by first and second potentials VS1 and VS2, these output buffers 29-1 to 29-17 become operative, so that it is possible to output data from a memory cell array, not shown. When, on the other hand, there occurs a non-coincidence, the respective output buffers 29-1 to 29-17 become non-operative and the output terminal is controlled to a high impedance state.

Figure 6:
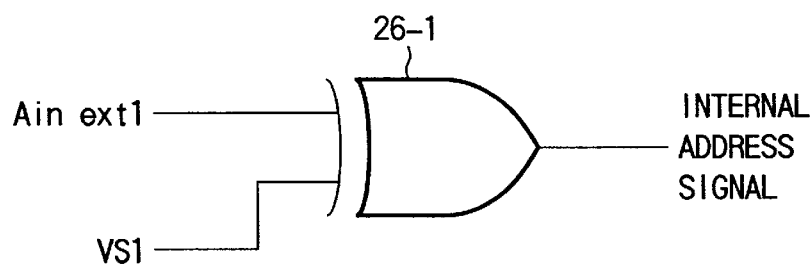
FIG. 6 is a circuit diagram showing one example of an input switching circuit in the construction shown in FIG. 5.

FIG. 6 is a circuit diagram showing an example of the input switching circuit 26-1 in the construction of FIG. 5. As shown in FIG. 6, the input switching circuit 26-1 is constructed by an exclusive OR circuit, outputs an "L" level signal as an internal address signal when the address signal Ainext1 and the first signal VS1 supplied from the option pin coincide with each other (at the time of access to the real memory space), and outputs an "H" level signal as an internal address signal at the time of non-coincidence (at the time of access to the virtual memory space). As the input switching circuit 26-1, a circuit with another logical construction may be used if the circuit inverts the address signal Ainext1 when the first potential VS1 applied to the option pin is set at the Vcc (or Vdd) level, that is, when the signal specifying the position of the real memory space in the virtual memory space is set at the "H" level and supplies the address signal as it is (without being inverted) to the internal portion when the first potential VS1 applied to the option pin is set at the Vss level, that is, "L" level. Of course, if the entire relation between the "H" level and the "L" level is reversed, the same function can be realized.

The input switching circuit 26-2 is formed with the same construction as the input switching circuit 26-1, and an internal address signal of "L" level is output when the address signal Ainext2 and the second potential VS2 applied from the option pin coincide with each other, and an internal address signal of "H" level is output at the time of non-coincidence.

For example, the chip address decoder circuit 28 is constructed by an AND gate, and outputs an "H" level signal when both of the output signals of the input switching circuits 26-1 and 26-2 are set at the "H" level and outputs an "L" level signal when at least one of the output signals is set at the "L" level. The output buffers 29-1 to 29-17 are controlled by an output signal of the chip address decoder circuit 28. For example, the output buffers 29-1 to 29-17 are each constructed by a 3-state buffer, data read out from the memory cell array accessed by the address decoder 27 is output when the output signals of the input switching circuits 26-1 and 26-2 coincide with each other and the output terminals of the output buffers 29-1 to 29-17 are set into the high impedance state at the time of non-coincidence.

With the above construction, for example, when a memory address of 3 to 4 Mbits is designated by the address signals Ain0 to Ain16 and Ainext1, Ainext2, access is made to the chip 11-4 to read out data therefrom, and at this time, the output terminals of the other chips 11-1, 11-2, 11-3 are set into the high impedance state so as not to disturb data output from the chip 11-4. Likewise, when a memory address of 0 to 1 Mbits, 1 to 2 Mbits or 2 to 3 Mbits is designated, data is read out from a selected one of the chips 11-1, 11-2 and 11-3 and the output terminals of the non-selected chips are set into the high impedance state so that collision of output data will not occur. Therefore, even when any address space of 0 to 4 Mbits is designated in the semiconductor memory system, the memory address can be freely accessed and it is not at all necessary to think that the system has a plurality of semiconductor chips mounted thereon. Further, if addresses lying over different chips are accessed, data can be continuously read out without feeling the interval between the chips.

As described above, according to the semiconductor memory device and semiconductor memory system of the first embodiment of this invention, since corresponding ones of all of the signal lines in a plurality of semiconductor memory chips can be commonly connected without using an exclusive chip selection controller or the like, the same interface as that used for a single chip can be obtained and the system can be used in exactly the same manner in a case wherein a plurality of semiconductor chips are mounted on the system and in a case wherein one chip is independently mounted on the system. Seemingly, the number of terminals, terminal-to-terminal pitches, arrangement, etc., in the card are exactly the same either in the mounting of a single chip or in the mounting of a plurality of chips. In order to achieve an advance design of the preceding generation system, it is possible to make such a design with the use of a plurality of smaller-storage-capacity semiconductor chips and at just the same interface as that of the preceding generation system of one chip version of greater memory capacity. This ensures a simplified design. Further, an input conversion circuit is simply inserted on a path for allowing an address signal for designating a virtual memory space to be input. Even if many more chips are mounted on a small-sized memory cared, a speed difference between a path for allowing the inputting of an address signal for designating the real memory space and a path for allowing the inputting of an address signal for designating the virtual memory space can be set to be smaller. Even from this view point, a simpler circuit design is also assured. On the system side, it is necessary to add an address signal line for specifying the virtual memory space to the input/output signal lines of the conventional semiconductor memory device. In the next generation memory, however, the address signal lines are indispensable. Since the construction of input/output signal lines of a memory of the next generation will be the same as the construction containing the added address signal line when the memory of the next generation is developed, addition of the address signal line will not cause any problem in developing the system in advance.

Further, since the option pin is provided to specify the position of the real memory space in the virtual memory space, a semiconductor memory device can be manufactured in exactly the same manufacturing process as in the conventional case and the semiconductor memory device can be formed without adding a special manufacturing step. In addition, when the semiconductor memory device is assembled into a package and then shipped, the position of the real memory space in the virtual memory space is determined at the time of shipment, but when the semiconductor memory device is shipped in the form of a chip and the user directly assembles the semiconductor memory device into a package, memory card or the like, it becomes extremely effective in the production management and the stock management since the user can specify the position of the real memory space in the virtual memory space after assembling. In this case, the user may be permitted to change portions to be wire bonded in order to set the internal state or change the connection relation on the lead frame or system board so as to change the internal state. Further, when the real memory space is set by bonding option or the like, the real memory space may be set after performing the operation test of the chip, and therefore, the same process test can be effected for all of the chips so that a plurality of chips can be tested while they are operated in substantially the same manner.

In the above embodiment, a case wherein a potential is applied to the option pin from the exterior to specify the position of the real memory space in the virtual memory space is explained, but it is possible to connect the option pin to the power supply Vcc (or Vdd) via a resistive element in the internal portion of the memory chip, use the address signals Ainext1, Ainext2 as internal address signals as they are when no potential is applied to the option pin from the exterior, and invert the address signals Ainext1, Ainext2 and use the inverted signals as internal address signals when the option pin is grounded in the exterior. Further, instead of the input switching circuits 26-1, 26-2, a circuit for designating a high order address of the virtual memory space when the first potential VS1 applied to the option pin is set at the Vcc (or Vdd) level, designating a low order address of the virtual memory space when the first potential VS1 applied to the option pin is set at the Vss level, and inhibiting use of the virtual memory space when it is set in the electrically open state may be provided. Of course, in this case, the same function can be attained even when the potential relation is reversed.

Further, in a small-sized memory card having a nonvolatile semiconductor memory device mounted thereon, if semiconductor memory chips are mounted on the front and rear surfaces of the mounting substrate of the memory card, corresponding ones of all of the input/output signal lines are commonly connected and the chips are specified to be the high-order address side chip or low-order address side chip according to the above-described methods, then the user of the memory card sets the same specification as that of a memory card having one chip mounted thereon without thinking that two chips are mounted. Therefore, the same memory card driver as that used for the memory card having one semiconductor memory chip mounted thereon can be used, the design of the portable electronic device is not necessary and the memory capacity is doubled. Further, a 2n (n=1, 2, 3, . . .) number of semiconductor memory chips, if being mounted on both surface sides of the mounting substrate, ensure 2n-times the storage capacity.

Figure 7:
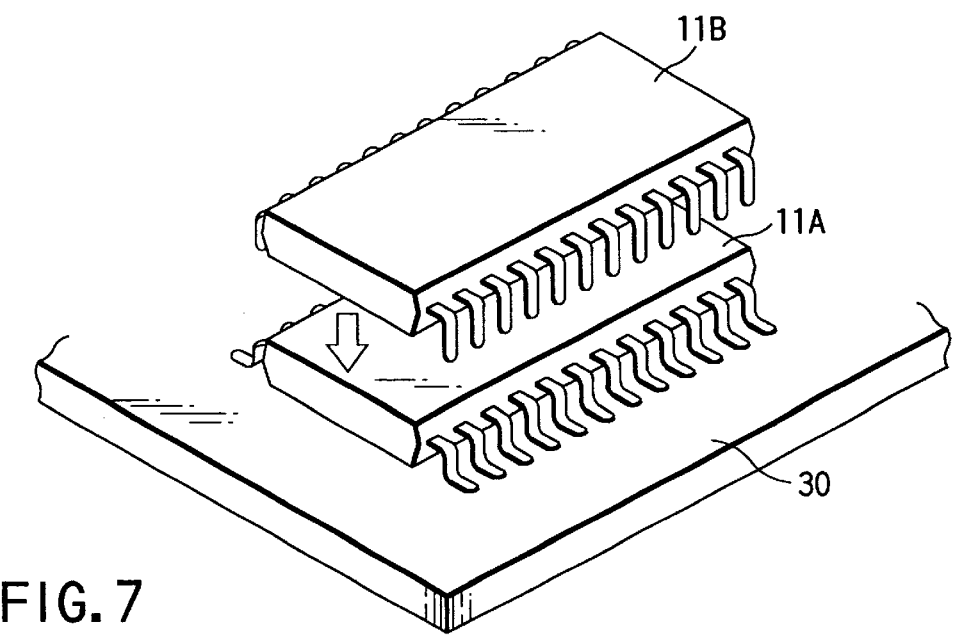
FIG. 7 is a perspective view showing an example of the construction obtained by stacking semiconductor memory chips on a system board in a multistage form.

Further, in the semiconductor memory system of this invention, since a plurality of semiconductor memory chips can be mounted on a single system by commonly using exactly the same signal lines, the semiconductor memory chips 11A, 11B can be stacked and mounted on a system board 30 as shown in FIG. 7. With this construction, the memory capacity can be increased without modifying the system board 30 at all and a flexible semiconductor memory system can be attained.

In the first embodiment described above, a case wherein the option pin is provided in addition to the input/output pins necessary for the normal operation in order to specify the position of the real memory space in the virtual memory space and the position of the real memory space is specified according to the potential applied to the option pin is explained as an example, but the position of the real memory space in the virtual memory space can be specified by use of various other methods. For example, redundancy relieving polysilicon fuses or metal fuses (electric blow type fuse elements or laser blow type fuse elements) used for relieving the memory when a defective memory cell is detected are provided in the semiconductor memory chip as real memory position setting means and the position of the real memory space in the virtual memory space may be determined according to whether the fuse is blowout or not. If the redundancy relieving fuses are used, the manufacturing process is not complicated since elements which are originally required for the semiconductor memory device are used, and little or no effect is given to the chip size because the fuse elements are fine. Further, the position of the real memory space in the virtual memory space can be specified according to whether or not wiring layers or terminals are connected by wire bonding. In the nonvolatile semiconductor memory device, in order to permit not only the manufacturer but also the user to specify the position of the real memory space in the virtual memory space, an auxiliary memory space is provided in addition to the original memory space and the position information of the real memory space in the virtual memory space may be stored in the auxiliary memory space by use of the nonvolatile characteristic.

Further, an example in which the output terminals of the output buffers 29-1 to 29-17 of the non-selected chip are set into the high impedance state is explained, but an input address of the virtual memory space is compared with an address of the real memory space specified by the option pin to check coincidence of the addresses, and the control operation may be effected to select an internal address only when the addresses coincide with each other and set all of the addresses of the chip into the non-selected state at the time of non-coincidence. With the above construction, the internal circuit can be simplified. Further, the chip may be set into the enable state only when the addresses coincide with each other and the chip may be set into the stand-by state when they do not coincide with each other. In addition, the operations for setting the output terminals of the output buffers into the high impedance state, setting the addresses into the non-selected state and setting the chip into the stand-by state may be selectively combined as required.

Next, a semiconductor memory device and semiconductor memory system according to a second embodiment in which this invention is applied to a device having addresses multiplexed as is represented by a NAND type flash memory are explained. FIG. 8 shows an example of the construction of a semiconductor memory system having eight NAND type flash memory chips mounted on a single system board. FIG. 9 schematically shows the relation between the real memory space and the virtual memory space in the system of FIG. 8. Semiconductor memory chips 11-1 to 11-8 are mounted on a system board 30 with corresponding ones of all of input/output pins commonly connected in parallel. As shown in FIG. 9, each of the memory chips 11-1 to 11-8 has a 1-Mbit real memory space and the address input circuit system and address decoder system are so constructed as to specify the 8-Mbit virtual memory space. A data output circuit system is formed with the same construction as that shown in FIG. 5, and when a specified chip is accessed, the output terminals of the other chips are set into the high impedance state so as to prevent output signals of the chips from colliding with each other.

In the NAND type flash memory, the address input pins and data I/O pins are commonly used and addresses and data are serially input or output. Generally, in a 1-Mbit semiconductor memory device, an address is designated by use of eight signal lines and an address is input from the signal lines in three divided input cycles. FIG. 10 illustrates an address input method for the NAND type flash memory. As shown in FIG. 10, address input pins (which are also data I/O pins) are 8 bits of Pin0 to Pin7, address signals A0 to A7 in the first cycle, address signals A8 to A15 in the second cycle, and address signals A16 to A20 in the third cycle are input to the address input pins Pin0 to Pin7. In the case of a conventional 1-Mbit NAND type flash memory, only two bit address signals input to the address input pins Pin0, Pin1 are used for access in the third address input cycle, but in the second embodiment of this invention, the address signals A18, A19, A20 input to the address input pins Pin2, Pin3, Pin4 are used as an address for specifying the position of the real memory space in the virtual memory space.

Therefore, in the semiconductor memory device according to the second embodiment, the virtual memory space can be represented in exactly same pin arrangement as in the conventional NAND type flash memory chip without adding a new pin (address input pin). Further, in the conventional NAND type flash memory, the address signals A18, A19, A20 are neglected although they are input, and since a portion of the 1-Mbit real memory space is selected even if any address signals are input to the address input pins Pin2, Pin3, Pin4, the storage contents thereof are output when the readout operation is effected. When the eight chips are mounted and corresponding ones of all of the input/output signal lines are commonly connected, all of the chips output respective data items, collision of output signals occurs and correct readout data cannot be obtained. In contrast, in the NAND type flash memory according to this invention, since data is output from only a selected one of the chips by setting at least one of the states including the high impedance state of the output terminals of the output buffers, the non-selected state of the address and the stand-by state of the chip when an address other than the previously specified addresses for the real memory space is input, correct data can be obtained. Further, even if an address other than the previously specified addresses for the real memory space is input and a program or erase command is input in order to interpret the address signals A18, A19, A20 added to represent the virtual memory space, the memory cell is not subjected to the programming process nor erasing process because a selected block is not present.

In a semiconductor memory device such as a NAND type flash memory having a function for automatically increasing an address in the chip, even if the position of the real memory space in the virtual memory space is simply specified by use of the option pin or one of other various methods, continuous access to different chips cannot be made because of the independently and automatically change the address in the chips. Therefore, in a system which requires continuous access to different chips, an input address of the virtual memory space may be received as it is irrespective of the state of the option pin or the signal indicating the position of the real memory space in the other virtual memory space, then the input address is set into the internal address counter, and the count value of the internal address counter may be determined by use of the option pin or the other method.

Figure 11:
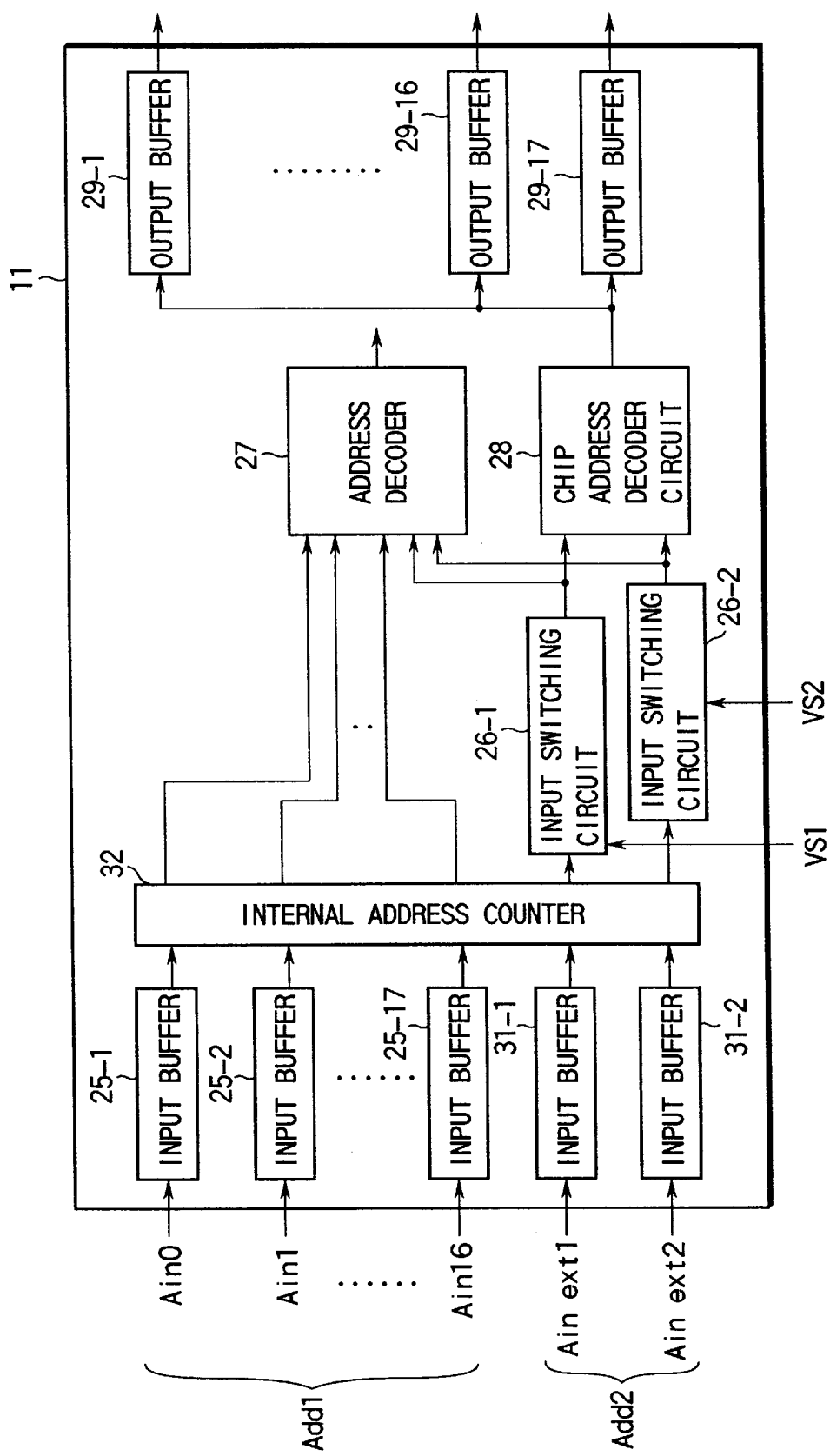
FIG. 11 is a block diagram showing the schematic construction of the main portions of an address input circuit system, address decoder system and data output circuit system extracted from a semiconductor memory device, for illustrating a semiconductor memory device and a semiconductor memory system according to a third embodiment of this invention.

FIG. 11 is a block diagram showing the schematic construction of the main portion extracted from the address input circuit system, address decoder system and data output circuit system, for illustrating a concrete example of the construction of a semiconductor memory device used in a system which requires continuous access to different chips. Like FIG. 5, an example of the construction of a semiconductor memory device obtained when four 1-Mbit semiconductor memory chips are mounted to construct a 4-Mbit semiconductor memory system is shown. Each chip has a one byte by 8 bits configuration and a 1-Mbit address space can be specified by use of 17 address signal lines. To the semiconductor memory system, a 2-bit address signal Add2 for permitting the virtual memory space VA which is four times the real memory space to be specified is input in addition to a first address signal Add1 of 17 bits necessary for specifying the 1-Mbit real memory space TA, TB, TC, TD corresponding to each chip. That is, input buffers (first input means) 25-1 to 25-17 are supplied with address signals Ain0 to Ain16 for specifying the real memory space and input buffers (second input means) 31-1, 31-2 are supplied with address signals Ainext1, Ainext2 for specifying the real memory space, respectively. Output signals of the input buffers 25-1 to 25-17 and 31-1, 31-2 are supplied to an internal address counter 32. The internal address counter functions as counting means and is constructed by a binary counter. The count value of the internal address counter 32 is supplied to an address decoder 27 and input switching circuits 26-1, 26-2. The input switching circuits 26-1 and 26-2 are respectively applied with first and second potentials VS1 and VS2 (Vcc or Vss) for specifying the position of the real memory space TA, TB, TC or TD of the chip in the virtual memory space VA from the option pins 17-1, 17-2, 17-3, . . . , 17-n. The input switching circuits 26-1, 26-2 effect the switching operation to supply the output signal of the internal address counter 32 as it is (non-inverted) as an internal address signal to the address decoder (address decoder means) 27 or supply them after inverting according to the first, second potentials VS1, VS2 indicating the position of the real memory space in the virtual memory space VA. The output signal of the internal address counter 32 and output signals (internal address signals) of the input switching circuits 26-2, 26-2 are supplied to the address decoder circuit 27 and decoded therein.

Further, the internal address signals output from the input switching circuits 26-2, 26-2 are supplied to a chip address decoder circuit (determining means) 28 for determining whether the corresponding chip is selected or not. The chip address decoder circuit 28 decides whether or not there occurs a coincidence between the chip address designated by the address signals Ainext1 and Ainext2 and the address designated by the first and second potentials VS1 and VS2. The operation or the non-operation of the respective output buffers (output means) 29-1 to 29-17 is controlled by the output of the chip address decoder circuit 28. When there occurs a coincidence between the chip address designated by the address signals Ainext1 and Ainext2 and the address designated by the first and second potentials VS1 and VS2, these output buffers 29-1 to 29-17 become operative and it is possible to output dada from the memory cell array not shown. If there is no coincidence, the respective output buffers 29-1 to 29-17 become inoperative and the output terminal is controlled to a high impedance state.

Like the example shown in FIG. 6, each of the input switching circuits 26-1, 26-2 in the construction of FIG. 11 is constructed by an exclusive OR circuit, outputs an "L" level signal as an internal address signal when the output signal of the address counter 32 and the first, second potentials VS1, VS2 supplied from the option pins 17-1, 17-2, 17-3, . . . , 17-n coincide with each other (at the time of access to the real memory space), and outputs an "H" level signal as an internal address signal at the time of non-coincidence (at the time of access to the virtual memory space). As the input switching circuits 26-1, 26-2, a circuit with another logical construction may be used if the circuit inverts the output signal of the internal address counter 32 when the first, second potentials VS1, VS2 applied to the option pins 17-1, 17-2, 17-3, . . . , 17-n are set at a Vcc (or Vdd) level, that is, when the signal specifying the position of the real memory space in the virtual memory space is set at the "H" level and supplies the output signal as it is (without inverting) to the internal portion when the first, second potentials VS1, VS2 applied to the option pin is set at the Vss level, that is, "L" level.

The chip address decoder circuit 28 and the output buffers 29-1 to 29-17 may be formed with the same construction as the circuit shown in FIG. 5.

With this construction, the internal address automatically increasing function can be coped with and the operation when a single chip is used and the operation when a plurality of chips are used can be made completely identical. As a result, even if continuous readout commands prepared for the NAND type flash memory are issued for a plurality of chips, access can be made without any problem and the user can use the system in exactly the same manner as if only one chip is mounted without thinking that a plurality of chips are mounted.

Further, there is a semiconductor memory device in which information of the highest address is continuously output if an instruction for automatically increasing the address up to an address higher than the set address is input in the semiconductor memory device, and therefore, in order to attain this function, an increase in the internal address is interrupted and information of the highest address may be continuously output when the virtual memory address reaches the highest address in the settable range.

As described above, according to this invention, it is possible to provide a semiconductor memory device in which the specification can be regarded as being exactly the same as a semiconductor memory device having a single chip mounted thereon when viewing from the exterior even if a plurality of semiconductor memory chips are mounted on a single system to increase the memory capacity thereof. Particularly, it is effective when a system having a memory capacity which is twice that of the system having a single chip mounted thereon is constructed by mounting semiconductor memory chips on the front and rear surfaces of the mounting substrate or stacking semiconductor memory chips on the substrate. Further, a command for continuously reading out data from the different chips can be used without feeling the interval between the chips. When a system construction of the next generation is studied, a system using semiconductor memory chips of the preceding generation can be made completely compatible with a system having a semiconductor memory chip of the next generation and the system can be developed completely independently from the development schedule of the semiconductor memory device.

As described above, according to this invention, it is possible to attain a semiconductor memory device which can be used in exactly the same manner in a case wherein a plurality of semiconductor memory chips are mounted on a single system and in a case wherein a single chip is mounted and a semiconductor memory system constructed by using a plurality of the semiconductor memory devices can be attained.

Further, it is possible to attain a semiconductor memory device which can be apparently observed the same when a plurality of semiconductor memory chips are mounted thereon and when a single chip is mounted thereon and can be designed according to the same interface as an interface used for the system of the next generation of one chip by use of a plurality of semiconductor memory chips of the preceding generation in order to design the system of the next generation in advance and a semiconductor memory system constructed by using a plurality of the semiconductor memory devices can be attained.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A semiconductor memory device comprising:
    a plurality of first input circuits supplied with a first address signal for specifying a real memory space of a memory cell array;
    at least a second input circuit supplied with a second address signal for specifying a virtual memory space having a capacity larger than a storage capacity of the memory cell array;
    real memory position setting circuit setting a position of an real memory space in the virtual memory space;
    determination circuit determining whether or not an address designated by the second address signal coincides with the position of the real memory space in the virtual memory space set by said real memory position setting circuit;
    address decoder circuit decoding an output signal of said plurality of first input circuits and accessing the memory cell array when said determination circuit determines that the real memory space is accessed; and
    output circuit outputting data read out from the memory cell array.

2. The semiconductor memory device according to claim 1, wherein said output circuit is set into a high impedance state when said determination circuit determines that the real memory space is not accessed.

3. The semiconductor memory device according to claim 1, wherein said real memory position setting circuit includes an electrically blow type fuse element or laser blow type fuse element and sets the position of the real memory space in the virtual memory space according to whether the electrically blow type fuse element or laser blow type fuse element is blowout or not.

4. The semiconductor memory device according to claim 1, wherein said real memory position setting circuit includes an option pin and sets the position of the real memory space in the virtual memory space according to a potential applied to said option pin.

5. The semiconductor memory device according to claim 1, wherein said real memory position setting circuit includes an option pin and sets the position of the real memory space in the virtual memory space according to a first potential or second potential applied to said option pin.

6. The semiconductor memory device according to claim 1, wherein said real memory position setting circuit includes an option pin for indicating whether the real memory space lies on a high address side or low address side of the virtual memory space, a high order address of the virtual memory space is specified when a first potential is applied to said option pin, low order address of the virtual memory space is specified when a second potential is applied to said option pin, and the virtual memory space is not used when the option pin is set in an electrically open state.

7. The semiconductor memory device according to claim 1, wherein said real memory position setting circuit includes a nonvolatile memory element for storing the position of the real memory space in the virtual memory space and specifies the position of the real memory space in the virtual memory space according to data stored in said nonvolatile memory element.

8. The semiconductor memory device according to claim 3, wherein whether the second address signal is used as an internal address signal as it is or used as an internal signal after being inverted is determined according to whether said fuse element is blowout or not to specify the position of the real memory space in the virtual memory space.

9. The semiconductor memory device according to claim 4, wherein the position of the real memory space in the virtual memory space is specified by using the second address signal as it is as an internal address signal when a first potential is applied to said option pin and inverting the second address signal and using the inverted signal as an internal address signal when a second potential is applied to said option pin.

10. The semiconductor memory device according to claim 5, wherein said option pin is coupled to a first potential and the position of the real memory space in the virtual memory space is specified by using the second address signal as it is as an internal address signal when no potential is applied to said option pin and inverting the second address signal and using the inverted signal as an internal address signal when a second potential is applied to said option pin.

11. The semiconductor memory device according to claim 7, wherein the second address signal is selectively used as an internal address signal as it is or after it is inverted based on data stored in said nonvolatile memory element to specify the position of the real memory space in the virtual memory space.

12. The semiconductor memory device according to claim 1, wherein the second address signal is compared with the position of the real memory space in the virtual memory space stored in said real memory position setting circuit and all of a addresses of the memory cell array are set into a non-selected state at the time of non-coincidence.

13. A semiconductor memory device comprising:
    a plurality of first input circuits supplied with a first address signal for specifying a real memory space of a memory cell array;
    at least a second input circuit supplied with a second address signal for specifying a virtual memory space having a capacity larger than a storage capacity of the memory cell array;
    counting circuit latching the first and second address signals input to said first and second input circuits and sequentially counting up the address signals;
    real memory position setting circuit setting a position of the real memory space in the virtual memory space;
    determination circuit determining whether or not an address designated by the second address signal coincides with the position of the real memory space in the virtual memory space set by said real memory position setting circuit;
    address decoder circuit decoding an output signal of said pluarality of first input circuits and accessing the memory cell array when said determination circuit determines that the real memory space is accessed; and output circuit for outputting data read out from the memory cell array;

wherein the second address signal is counted up by said counting circuit irrespective of the setting contents of said real memory position setting circuit and an output signal corresponding to the second address signal is controlled to be inverted or not according to the setting contents of said real memory position setting circuit before a count output of said counting circuit is input to said address decoder circuit.

14. A semiconductor memory device comprising:

an input buffer supplied with a first address signal for specifying a real memory space of a memory cell array;

real memory position setting circuit setting a position of the real memory space in a virtual memory space having a capacity larger than a storage capacity of an memory cell array;

an input switching circuit supplied with a second address signal for specifying the virtual memory space, for inverting the second address signal or keeping the second address signal non-inverted to form an internal address signal according to the position of the real memory space in the virtual memory space set by said real memory position setting circuit;

an address decoder decoding an output signal from said input buffer and the internal address signal output from said input switching circuit to access the memory cell array;

an output buffer outputting data read out from the memory cell array; and a chip address decoder circuit decoding the internal address signal output from said input switching circuit and setting an output terminal of said output buffer into a high impedance state when the real memory space is not accessed.

15. The semiconductor memory device according to claim 14, wherein said real memory position setting circuit includes an electrically blow type fuse element or laser blow type fuse element and sets the position of the real memory space in the virtual memory space according to whether the electrically blow type fuse element or laser blow type fuse element is blowout or not.

16. The semiconductor memory device according to claim 14, wherein said real memory position setting circuit includes an option pin and sets the position of the real memory space in the virtual memory space according to a potential applied to said option pin.

17. The semiconductor memory device according to claim 14, wherein said real memory position setting circuit includes an option pin and sets the position of the real memory space in the virtual memory space according to a first potential or second potential applied to said option pin.

18. The semiconductor memory device according to claim 14, wherein said real memory position setting circuit includes an option pin for indicating whether the real memory space lies on a high address side or low address side of the virtual memory space, a high order address of the virtual memory space is specified when a first potential is applied to said option pin, a low order address of the virtual memory space is specified when a second potential is applied to said option pin, and the virtual memory space is not used when the option pin is set in an electrically open state.

19. The semiconductor memory device according to claim 14, wherein said real memory position setting means includes a nonvolatile memory element for storing the position of the real memory space in the virtual memory space and specifies the position of the real memory space in the virtual memory space according to data stored in said nonvolatile memory element.

20. The semiconductor memory device according to claim 15, wherein whether the second address signal is used as an internal address signal as it is or used as an internal signal after being inverted is determined according to whether said fuse element is blowout or not to specify the position of the real memory space in the virtual memory space.

21. The semiconductor memory device according to claim 16, wherein the position of the real memory space in the virtual memory space is specified by using the second address signal as it is as an internal address signal when a first potential is applied to said option pin and inverting the second address signal and using the inverted signal as an internal address signal when a second potential is applied to said option pin.

22. The semiconductor memory device according to claim 17, wherein said option pin is coupled to a first potential and the position of the real memory space in the virtual memory space is specified by using the second address signal as it is as an internal address signal when no potential is applied to said option pin and inverting the second address signal and using the inverted signal as an internal address signal when a second potential is applied to said option pin.

23. The semiconductor memory device according to claim 19, wherein the second address signal is selectively used as an internal address signal as it is or after it is inverted based on data stored in said nonvolatile memory element to specify the position of the real memory space in the virtual memory space.

24. The semiconductor memory device according to claim 14, wherein the second address signal is compared with the position of the real memory space in the virtual memory space stored in said real memory position setting circuit and all of the addresses of the memory cell array are set into a non-selected state at the time of non-coincidence.

25. A semiconductor memory device comprising:

an input buffer supplied with a first address signal for specifying a real memory space of a memory cell array;

a real memory position setting circuit setting a position of the real memory space in a virtual memory space having a capacity larger than a storage capacity of an memory cell array;

an input switching circuit supplied with a second address signal for specifying the virtual memory space, for inverting the second address signal or keeping the second address signal non-inverted to form an internal address signal according to the position of the real memory space in the virtual memory space set by said real memory position setting circuit;

an address decoder decoding an output signal from said input buffer and the internal address signal output from said input switching circuit to access the memory cell array;

an output buffer outputting data read out from the memory cell array; and a chip address decoder circuit decoding the internal address signal output from said input switching circuit and setting a chip into a stand-by state when the real memory space is not accessed.

26. The semiconductor memory device according to claim 25, wherein said real memory position setting circuit includes an electrically blow type fuse element or laser blow type fuse element and sets the position of the real memory space in the virtual memory space according to whether the electrically blow type fuse element or laser blow type fuse element is blowout or not.

27. The semiconductor memory device according to claim 25, wherein said real memory position setting circuit includes an option pin and sets the position of the real memory space in the virtual memory space according to a potential applied to said option pin.

28. The semiconductor memory device according to claim 25, wherein said real memory position setting circuit includes an option pin and sets the position of the real memory space in the virtual memory space according to a first potential or second potential applied to said option pin.

29. The semiconductor memory device according to claim 25, wherein said real memory position setting circuit includes an option pin for indicating whether the real memory space lies on a high address side or low address side of the virtual memory space, a high order address of the virtual memory space is specified when a first potential is applied to said option pin, a low order address of the virtual memory space is specified when a second potential is applied to said option pin, and the virtual memory space is not used when the option pin is set in an electrically open state.

30. The semiconductor memory device according to claim 25, wherein said real memory position setting circuit includes a nonvolatile memory element for storing the position of the real memory space in the virtual memory space and specifies the position of the real memory space in the virtual memory space according to data stored in said nonvolatile memory element.

31. The semiconductor memory device according to claim 26, wherein whether the second address signal is used as an internal address signal as it is or used as an internal signal after being inverted is determined according to whether said fuse element is blowout or not to specify the position of the real memory space in the virtual memory space.

32. The semiconductor memory device according to claim 27, wherein the position of the real memory space in the virtual memory space is specified by using the second address signal as it is as an internal address signal when a first potential is applied to said option pin and inverting the second address signal and using the inverted signal as an internal address signal when a second potential is applied to said option pin.

33. The semiconductor memory device according to claim 28, wherein said option pin is coupled to a first potential and the position of the real memory space in the virtual memory space is specified by using the second address signal as it is as an internal address signal when no potential is applied to said option pin and inverting the second address signal and using the inverted signal as an internal address signal when a second potential is applied to said option pin.

34. The semiconductor memory device according to claim 30, wherein the second address signal is selectively used as an internal address signal as it is or after it is inverted based on data stored in said nonvolatile memory element to specify the position of the real memory space in the virtual memory space.

35. The semiconductor memory device according to claim 25, wherein the second address signal is compared with the position of the real memory space in the virtual memory space stored in said real memory position setting circuit and all addresses of the memory cell array are set into a non-selected state at the time of non-coincidence.

36. A semiconductor memory device comprising:
an input buffer supplied with a first address signal for specifying a real memory space of a memory cell array;
a real memory position setting circuit setting a position of the real memory space in a virtual memory space having a capacity larger than a storage capacity of an memory cell array;
an input switching circuit supplied with a second address signal for specifying the virtual memory space, for inverting the second address signal or keeping the second address signal non-inverted to form an internal address signal according to the position of the real memory space in the virtual memory space set by said real memory position setting circuit;
an address decoder decoding an output signal from said input buffer and the internal address signal output from said input switching circuit to access the memory cell array;
an output buffer outputting data read out from the memory cell array; and
a chip address decoder circuit decoding the internal address signal output from said input switching circuit and setting a chip into a stand-by state and setting an output terminal of said output buffer into a high impedance state when the real memory space is not accessed.

37. The semiconductor memory device according to claim 36, wherein said real memory position setting circuit includes an electrically blow type fuse element or laser blow type fuse element and sets the position of the real memory space in the virtual memory space according to whether the electrically blow type fuse element or laser blow type fuse element is blowout or not.

38. The semiconductor memory device according to claim 36, wherein said real memory position setting circuit includes an option pin and sets the position of the real memory space in the virtual memory space according to a potential applied to said option pin.

39. The semiconductor memory device according to claim 36, wherein said real memory position setting circuit includes an option pin and sets the position of the real memory space in the virtual memory space according to a first potential or second potential applied to said option pin.

40. The semiconductor memory device according to claim 36, wherein said real memory position setting circuit includes an option pin for indicating whether the real memory space lies on a high address side or low address side of the virtual memory space, a high order address of the virtual memory space is specified when a first potential is applied to said option pin, a low order address of the virtual memory space is specified when a second potential is applied to said option pin, and the virtual memory space is not used when the option pin is set in an electrically open state.

41. The semiconductor memory device according to claim 36, wherein said real memory position setting circuit includes a nonvolatile memory element for storing the position of the real memory space in the virtual memory space and specifies the position of the real memory space in the virtual memory space according to data stored in said nonvolatile memory element.

42. The semiconductor memory device according to claim 37, wherein whether the second address signal is used as an internal address signal as it is or used as an internal signal after being inverted is determined according to whether said fuse element is blowout or not to specify the position of the real memory space in the virtual memory space.

43. The semiconductor memory device according to claim 38, wherein the position of the real memory space in the virtual memory space is specified by using the second address signal as it is as an internal address signal when a first potential is applied to said option pin and inverting the second address signal and using the inverted signal as an internal address signal when a second potential is applied to said option pin.

44. The semiconductor memory device according to claim 39, wherein said option pin is coupled to a first potential and the position of the real memory space in the virtual memory space is specified by using the second address signal as it is as an internal address signal when no potential is applied to said option pin and inverting the second address signal and using the inverted signal as an internal address signal when a second potential is applied to said option pin.

45. The semiconductor memory device according to claim 41, wherein the second address signal is selectively used as an internal address signal as it is or after it is inverted based on data stored in said nonvolatile memory element to specify the position of the real memory space in the virtual memory space.

46. The semiconductor memory device according to claim 36, wherein the second address signal is compared with the position of the real memory space in the virtual memory space stored in said real memory position setting circuit and all of a addresses of the memory cell array are set into a non-selected state at the time of non-coincidence.

47. A semiconductor memory system comprising:
a plurality of semiconductor memory devices mounted with corresponding ones of all of input/output signal pins commonly connected in parallel;
each of said plurality of semiconductor memory devices including:
a plurality of first input circuits supplied with a first address signal for specifying a real memory space of a memory cell array;
at least a second input circuit supplied with a second address signal for specifying a virtual memory space having a capacity larger than a storage capacity of the memory cell array;
real memory position setting circuit setting a position of the real memory space in the virtual memory space;
determination circuit determining whether or not an address designated by the second address signal coincides with the position of the real memory space in the virtual memory space set by said real memory position setting circuit;
address decoder circuit decoding an output signal of said plurality of first input circuit and accessing the memory cell array when said determination circuit determines that the real memory space is accessed; and
output circuit outputting data read out from the memory cell array;
wherein said output circuit is set into a high impedance state when said determination circuit determines that the real memory space is not accessed.

48. The semiconductor memory system according to claim 47, wherein a plurality of chips equals 2n where n is an integer, of said semiconductor memory devices are mounted on front and rear surfaces of a mounting substrate and the virtual memory space is 2n-times the real memory space.

49. The semiconductor memory system according to claim 48, wherein at least one of readout, programming and erasing operations is effected for the virtual memory space, each chip is operated as an individual semiconductor memory device when an address specified by the first and second address signals coincides with the real memory space set in said real memory position setting circuit for each chip, and all of the chips effects the operation of an address non-selection state when the specified address does not coincide with the real memory space set in said real memory position setting means.

50. A semiconductor memory system comprising:
a plurality of semiconductor memory devices mounted with corresponding ones of all of input/output signal pins commonly connected in parallel;
each of said plurality of semiconductor memory devices including:
plurality of first input circuits supplied with a first address signal for specifying a real memory space of a memory cell array;
at least a second input circuit supplied with a second address signal for specifying a virtual memory space having a capacity larger than a storage capacity of the memory cell array;
real memory position setting circuit setting a position of the real memory space in the virtual memory space;
determination circuit determining whether or not an address designated by the second address signal coincides with the position of the real memory space in the virtual memory space set by said real memory position setting circuit;
address decoder circuit decoding an output signal of said plurality of first input circuits and accessing the memory cell array when said determination circuit determines that the real memory space is accessed; and
output circuit outputting data read out from the memory cell array;
wherein a semiconductor memory chip is set into a stand-by state when said determination circuit determines that the real memory space is not accessed.

51. The semiconductor memory system according to claim 50, wherein a plurality of chips equals 2n, where n is an integer, of said semiconductor memory devices are mounted on front and rear surfaces of a mounting substrate and the virtual memory space is 2n-times the real memory space.

52. The semiconductor memory system according to claim 51, wherein at least one of readout, programming and erasing operations is effected for the virtual memory space, each chip is operated as an individual semiconductor memory device when an address specified by the first and second address signals coincides with the real memory space set in said real memory position setting circuit for each chip, and all of the chips effects the operation of an address non-selection state when the specified address does not coincide with the real memory space set in said real memory position setting circuit.

53. A semiconductor memory system comprising:
a plurality of semiconductor memory devices mounted with corresponding ones of all of input/output signal pins commonly connected in parallel;
each of said plurality of semiconductor memory devices including:
plurality of first input circuits supplied with a first address signal for specifying a real memory space of a memory cell array;
at least a second input circuit supplied with a second address signal for specifying a virtual memory space having a capacity larger than a storage capacity of the memory cell array;

real memory position setting circuit for setting a position of the real memory space in the virtual memory space;

determination circuit determining whether or not an address designated by the second address signal coincides with the position of the real memory space in the virtual memory space set by said real memory position setting circuit;

address decoder circuit decoding an output signal of said plurality of first input circuit and accessing the memory cell array when said determination circuit determines that the real memory space is accessed; and output circuit outputting data read out from the memory cell array;

wherein a semiconductor memory chip is set into a stand-by state and said output circuit is set into a high impedance state when said determination circuit determines that the real memory space is not accessed.

54. The semiconductor memory system according to claim 53, wherein a plurality of chips equals 2n, where n is an integer, of said semiconductor memory devices are mounted on front and rear surfaces of a mounting substrate and the virtual memory space is 2n-times the real memory space.

55. The semiconductor memory system according to claim 54, wherein at least one of readout, programming and erasing operations is effected for the virtual memory space, each chip is operated as an individual semiconductor memory device when an address specified by the first and second address signals coincides with the real memory space set in said real memory position setting circuit for each chip, and all of the chips effects the operation of an address non-selection state when the specified address does not coincide with the real memory space set in said real memory position setting circuit.

56. A semiconductor memory system comprising:

a plurality of semiconductor memory devices mounted with corresponding ones of all of input/output signal pins commonly connected in parallel;

each of said plurality of semiconductor memory devices including:

an input buffer supplied with a first address signal for specifying a real memory space of a memory cell array;

real memory position setting circuit setting a position of the real memory space in virtual memory space having a capacity larger than a storage capacity of the memory cell array;

an input switching circuit supplied with a second address signal for specifying the virtual memory space, for inverting the second address signal or keeping the second address signal non-inverted to form an internal address signal according to the position of the real memory space in the virtual memory space set by said real memory position setting means;

an address decoder decoding an output signal from said input buffer and the internal address signal output from said input switching circuit to access the memory cell array;

an output buffer outputting data read out from the memory cell array; and a chip address decoder circuit decoding the internal address signal output from said input switching circuit and setting an output terminal of said output buffer into a high impedance state when the real memory space is not accessed.

57. The semiconductor memory system according to claim 56, wherein a plurality of chips equals 2n, where n is an integer, of said semiconductor memory devices are mounted on front and rear surfaces of a mounting substrate and the virtual memory space is 2n-times the real memory space.

58. The semiconductor memory system according to claim 57, wherein at least one of readout, programming and erasing operations is effected for the virtual memory space, each chip is operated as an individual semiconductor memory device when an address specified by the first and second address signals coincides with the real memory space set in said real memory position setting circuit for each chip, and all of the chips effects the operation of an address non-selection state when the specified address does not coincide with the real memory space set in said real memory position setting circuit.

59. A semiconductor memory system comprising:

a plurality of semiconductor memory devices mounted with corresponding ones of all of input/output signal pins commonly connected in parallel;

each of said plurality of semiconductor memory devices including:

an input buffer supplied with a first address signal for specifying a real memory space of a memory cell array;

real memory position setting means for setting a position of the real memory space in an virtual memory space having a capacity larger than a storage capacity of the memory cell array;

an input switching circuit supplied with a second address signal for specifying the virtual memory space, for inverting the second address signal or keeping the second address signal non-inverted to form an internal address signal according to the position of the real memory space in the virtual memory space set by said real memory position setting circuit;

an address decoder decoding an output signal from said input buffer and the internal address signal output from said input switching circuit to access the memory cell array;

an output buffer outputting data read out from the memory cell array; and a chip address decoder circuit decoding the internal address signal output from said input switching circuit and setting a semiconductor memory chip into a stand-by state when the real memory space is not accessed.

60. The semiconductor memory system according to claim 59, wherein a plurality of chips equals 2n, where n is an integer, of said semiconductor memory devices are mounted on front and rear surfaces of a mounting substrate and the virtual memory space is 2n-times the real memory space.

61. The semiconductor memory system according to claim 60, wherein at least one of readout, programming and erasing operations is effected for the virtual memory space, each chip is operated as an individual semiconductor memory device when an address specified by the first and second address signals coincides with the real memory space set in said real memory position setting circuit for each chip, and all of the chips effects the operation of an address non-selection state when the specified address does not coincide with the real memory space set in said real memory position setting circuit.

62. A semiconductor memory system comprising:
a plurality of semiconductor memory devices mounted with corresponding ones of all of input/output signal pins commonly connected in parallel;
each of said plurality of semiconductor memory devices including:
an input buffer supplied with a first address signal for specifying a real memory space of a memory cell array;
real memory position setting circuit setting a position of the real memory space in virtual memory space having a capacity larger than a storage capacity of the memory cell array;
an input switching circuit supplied with a second address signal for specifying the virtual memory space, for inverting the second address signal or keeping the second address signal non-inverted to form an internal address signal according to the position of the real memory space in the virtual memory space set by said real memory position setting circuit;
an address decoder decoding an output signal from said input buffer and the internal address signal output from said input switching circuit to access the memory cell array;
an output buffer outputting data read out from the memory cell array; and
a chip address decoder circuit decoding the internal address signal output from said input switching circuit and setting a semiconductor memory chip into a stand-by state and setting an output terminal of said output buffer into a high impedance state when the real memory space is not accessed.

63. The semiconductor memory system according to claim 62, wherein a plurality of chips equals 2n, where n is an integer, of said semiconductor memory devices are mounted on front and rear surfaces of a mounting substrate and the virtual memory space is 2n-times the real memory space.

64. The semiconductor memory system according to claim 63, wherein at least one of readout, programming and erasing operations is effected for the virtual memory space, each chip is operated as an individual semiconductor memory device when an address specified by the first and second address signals coincides with the real memory space set in said real memory position setting circuit for each chip, and all of the chips effects the operation of an address non-selection state when the specified address does not coincide with the real memory space set in said real memory position setting circuit.

65. A semiconductor memory device comprising:
a plurality of semiconductor memory chips, each of said semiconductor memory chips including N input buffers, where N is a positive integer, M input switching circuits, where M is a positive integer, and a plurality of output buffers, said M input switching circuits being supplied with predetermined signals;
N input signal lines respectively coupled to the N input buffers of each of said semiconductor memory chips;
M input signal lines respectively coupled to the M input buffers of each of said semiconductor memory chips; and
a plurality of output signal lines coupled to the output buffers of each of said semiconductor memory chips;
wherein each of said input switching circuits determines which one of the semiconductor memory chips should be selected, in accordance with said predetermined signals and a signal supplied through said M input signal lines.

66. The semiconductor memory device according to claim 65, wherein said predetermined signals are a combination of a high power supply potential and a low power supply potential.

67. The semiconductor memory device according to claim 65, wherein said predetermined signals are a combination of signals determined by whether or not a fuse element is blown out.

68. A semiconductor memory system comprising:
a system board having a plurality of inputs pins; and
a plurality of semiconductor memory chips mounted on the system board, each of said semiconductor memory chips including a plurality of memory cells,
wherein address signals are supplied to the input pins of the system board, the address signals having first address signals to designate the memory cells of semiconductor memory chips and second address signals to designate the semiconductor chips on the system board, the first address signals are divided into I groups, where I is an integer larger than 1, and supplied to the input pins in a divisional way I times, and the second address signals are included in at least one group of the I groups.

69. The semiconductor memory system according to claim 68, wherein the address signals to designate the semiconductor memory chips serve to select only one of the semiconductor memory chips.

70. The semiconductor memory system according to claim 68, wherein the second address signals to designate the semiconductor chips on the system board are included in only one of the I groups.

71. A method for dividing address signals into K groups, where K is an integer larger than 1, supplied to a system board in a divisional way K times, said system comprising a plurality of semiconductor memory chips each including a plurality of memory cells; and further comprising J input pins, where J is an integer larger than 1, said method comprising the steps of:
supplying the dividing address signals divided by (K-n) groups, where n is a positive integer and smaller than K, to the input pins (K-n) times, the dividing address signals divided by (K-n) group include one part of address signals to designate the memory cells of the semiconductor memory chips, and supplying dividing address signals divided by n groups to the input pins n times, the dividing address signals divided by n groups include other part of address signals to designate the memory cells of semiconductor memory chips and address signals to designate the semiconductor chips on the system board.

72. The method according to claim 71, wherein said n is 1.

* * * * *